Figure 1:
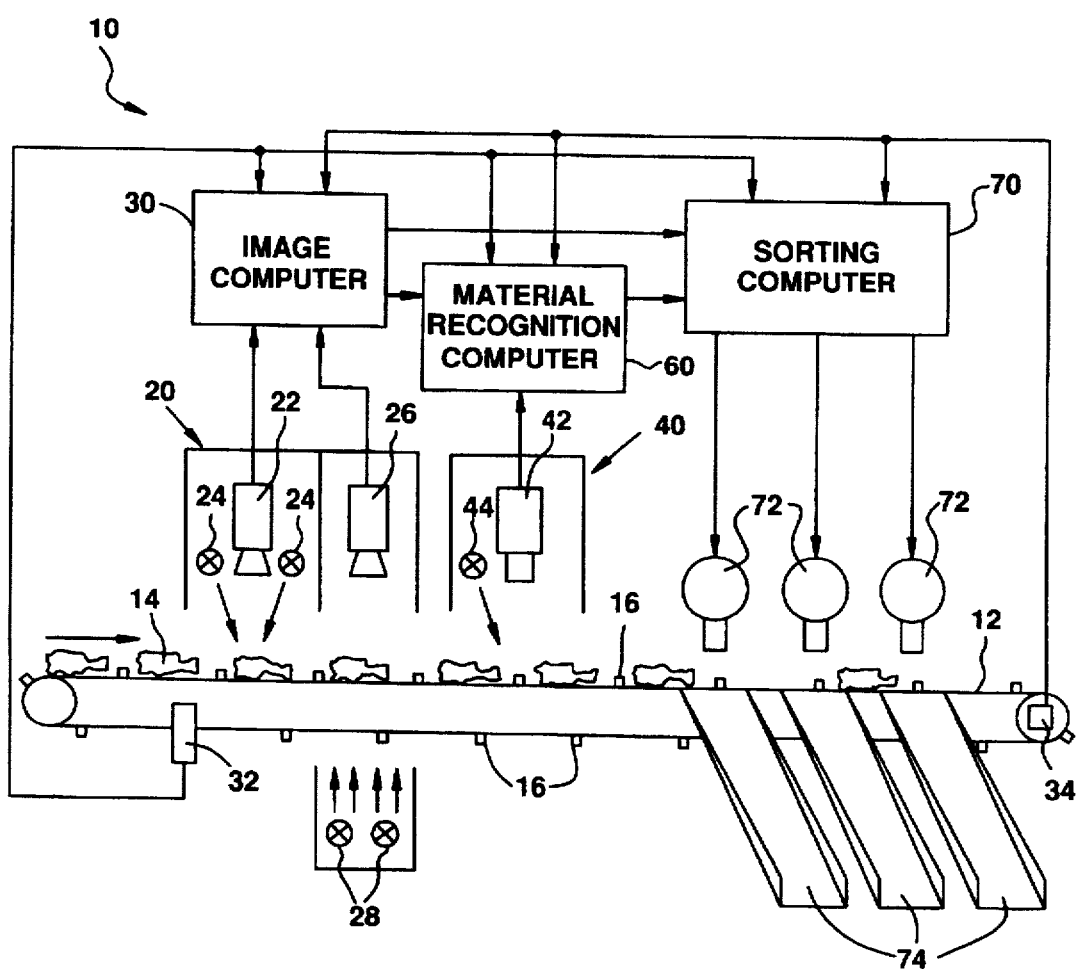

United States Patent [19]

Massen

[11] Patent Number: 5,794,788
[45] Date of Patent: Aug. 18, 1998

[54] METHOD AND DEVICE FOR SORTING MATERIALS

[76] Inventor: Robert Massen, Am Rebberg 29, 78337 Öhningen, Germany

[21] Appl. No.: 535,052

[22] PCT Filed: Apr. 28, 1994

[86] PCT No.: PCT/EP94/01348

§ 371 Date: Oct. 30, 1995

§ 102(e) Date: Oct. 30, 1995

[87] PCT Pub. No.: WO94/25186

PCT Pub. Date: Nov. 10, 1994

[30] Foreign Application Priority Data

Apr. 30, 1993 [DE] Germany .............. 43 14 396.2
Jun. 20, 1993 [DE] Germany .............. 43 20 331.0

[51] Int. Cl.$^6$ .................................................. B07C 5/00
[52] U.S. Cl. ............... 209/524; 209/580; 209/585; 209/587; 209/588; 209/589
[58] Field of Search ...................... 209/524, 576, 209/577, 580, 585, 587, 588, 589

[56] References Cited

U.S. PATENT DOCUMENTS

| 4,919,534 | 4/1990 | Reed ................... | 209/524 X |
| 5,041,996 | 8/1991 | Emering ............... | 364/550 |
| 5,134,291 | 7/1992 | Ruhl, Jr. et al. ....... | 209/587 X |
| 5,141,110 | 8/1992 | Trischan et al. ....... | 209/524 |
| 5,318,172 | 6/1994 | Kenny et al. .......... | 209/524 |
| 5,502,559 | 3/1996 | Powell et al. ......... | 209/524 X |

FOREIGN PATENT DOCUMENTS

| 0539735 | 9/1992 | European Pat. Off. . |
| 3039979 | 4/1982 | Germany . |
| 3339164 | 5/1984 | Germany . |
| 3443476 | 5/1986 | Germany . |
| 3906281 | 10/1989 | Germany . |
| 4111686 | 10/1992 | Germany . |
| 4125044 | 2/1993 | Germany . |
| 4128176 | 2/1993 | Germany . |
| 4207835 | 9/1993 | Germany . |
| 4305006 | 9/1993 | Germany . |

OTHER PUBLICATIONS

"Steuerungssysteme fur Verteil-and Sortieranlangen" (Control Systems for Distribution and Sorting Assemblies). Journal F+H Fordern und Heben 1990, No. 6, pp. 390–393.

*Primary Examiner*—David H. Bollinger
*Attorney, Agent, or Firm*—Sixbey, Freidman, Leedom & Ferguson, P.C.; Gerald J. Ferguson, Jr.; Tim L. Brackett, Jr.

[57] ABSTRACT

To sort materials, in particular plastic parts, the items are carried at known conveying speed past a material recognition system which uses non-contact scanning, for example NIR spectroscopy, of each item to determine its material type and delivers a signal that identifies the type of material, which signal is used in sorting the items according to material type. To ensure that the determination of material type is done at a spot on the item that is not disturbed by a label, metal stamp or the like, the items are also conveyed past an imaging system which takes pictures of the items from which, using electronic image-processing techniques, features of colour and/or shape of the items are determined, from which in turn position data are derived about spots on the item at which an undisturbed determination of material type is possible. With the aid of these position data the determination of material type is then confined to such undisturbed spots.

23 Claims, 4 Drawing Sheets

METHOD AND DEVICE FOR SORTING MATERIALS

The invention relates to a method for sorting materials, in particular plastic parts.

For the separation of plastics for recycling purposes, non-contact, optical methods based on NIR spectroscopy are known. The plastic parts are illuminated with a source of light in the near infra-red range, and the reflectance spectrum is obtained. This shows distinct differences, on the basis of which separation according to material types can take place. Known apparatuses of this kind detect a passing plastic part, such as a bottle, a cup or similar with one or several measuring spots and calculate the NIR spectrum from the light reflected by the illuminated measuring spot. However, a precondition is that the measuring spot is not disturbed by a label, metal stamp or similar stick-on labels which will falsify the reflectance spectrum. Sharp edges can also render the measuring result incorrect or uncertain. Similar non-contact sensors based on microwaves or X-radiation are known, but are subject to the same limitations.

On the other hand, an optical imaging system for sorting plastic parts by colour, based on the use of colour video cameras, is known. In this case, pictures of the plastic parts conveyed past are taken, either in incident or transmitted light, using a colour video camera, and the form and/or colour is classified by an image computer. An image computer suitable for this is already known, for example, from the PCT publication WO 90/10273, in which the classification of form and colour is described, using the automatic optical classification of plants as an example. However, with this known system it is not possible to distinguish and separate plastic parts according to material type.

The object of the invention is to provide a method, which enables materials to be sorted with reliable and undisturbed determination of the types of material and with a versatile selection of sorting criteria, as well as a device for implementing the method.

To achieve this object, a method for sorting materials, in particular plastic parts, wherein the items are carried at known conveying speed past a material recognition system, which uses non-contact scanning of each item within a measuring field to determine its material type and delivers a signal that identifies the material type and is used in sorting the items according to material type, is characterized according to the invention in that the items are conveyed past an imaging system which takes pictures of the items from which, using electronic image-processing techniques, features of colour and/or shape of the items are detected, that from the features of colour and/or shape position data are derived regarding spots on the item at which an undisturbed determination of material type is possible, and that the determination of the material type by the material recognition system is confined to such undisturbed spots as identified by the position data.

By linking the material type determination to the results of electronic image processing the method according to the invention enables the material type of the items to be determined only at those spots where undisturbed determination of the material type is possible. Moreover, it is also possible, in the case of items which contain components of different material types, to determine the material types of the individual components separately. Finally, the features of colour and/or shape obtained by electronic image processing are available as additional sorting criteria.

Advantageous configurations and further developments of the method according to the invention and a device f or implementing the method are characterized in the subclaims.

Figure 2:
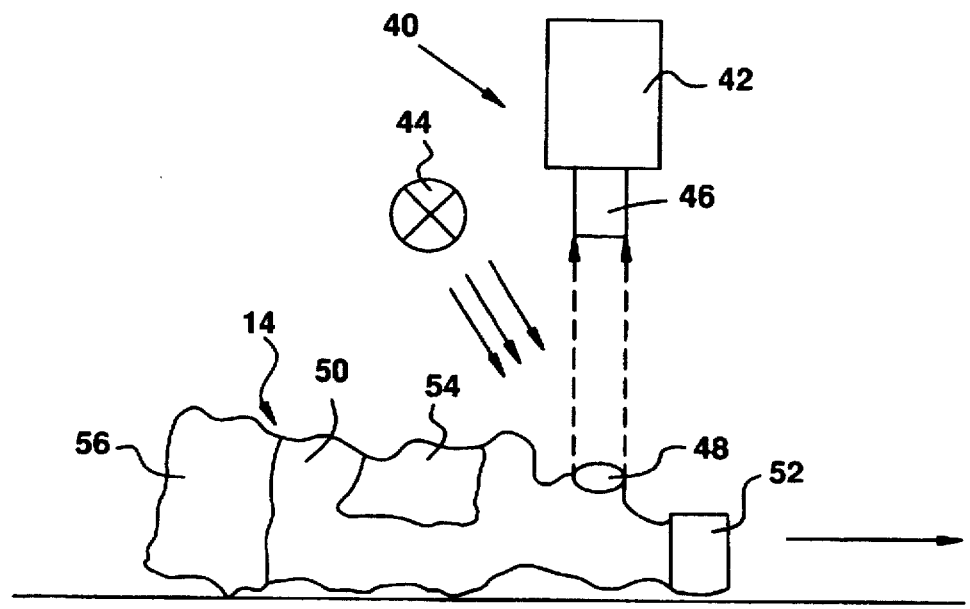
Figure 3:
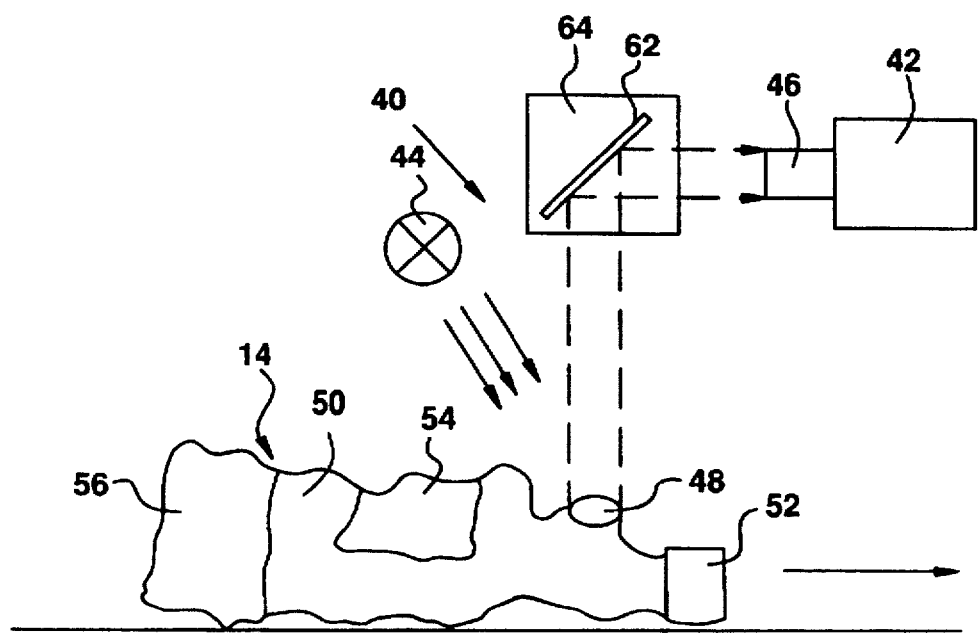
Figure 4:
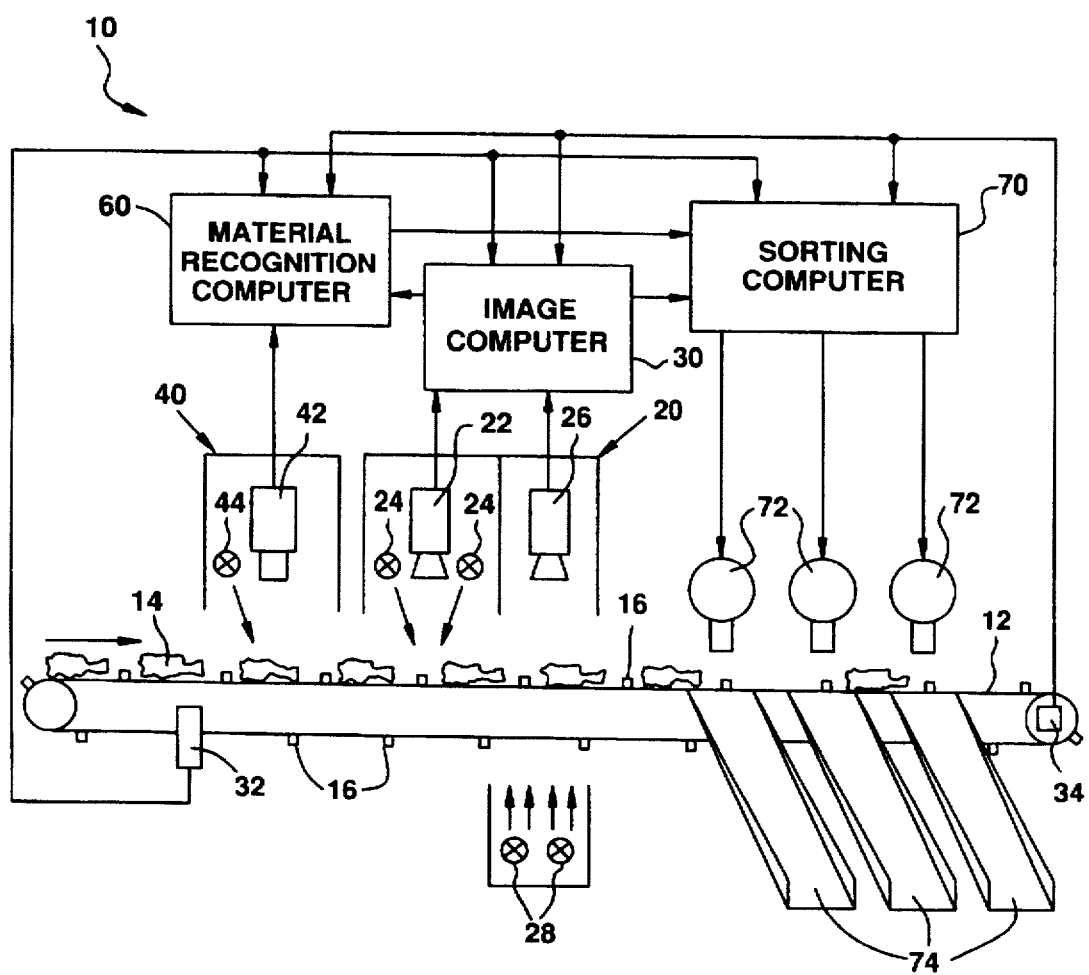
Figure 5:
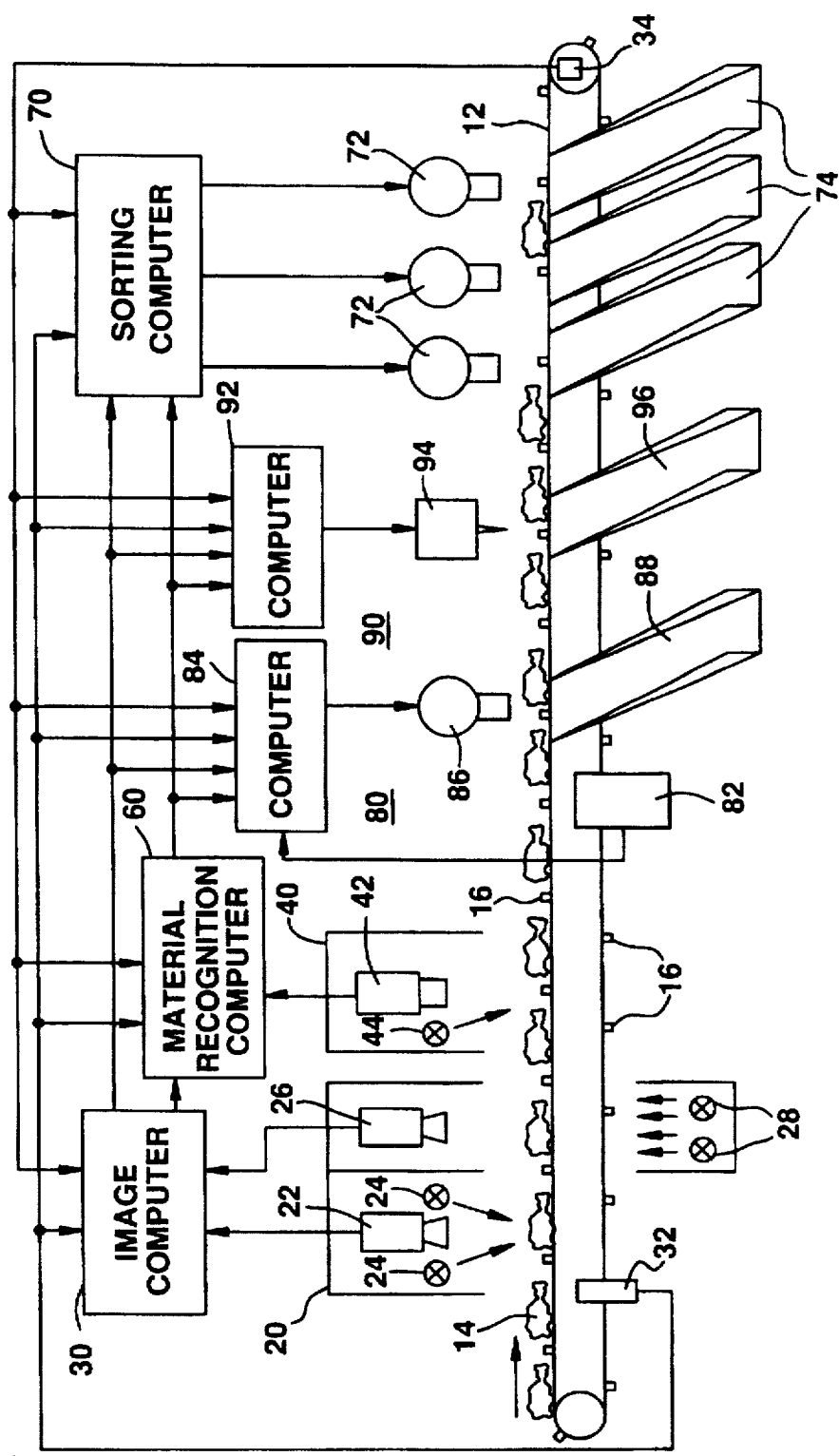

Further features and advantages of the invention ensue from the following description of practical examples of embodiments shown in the drawings. In the drawings FIG. 1 shows a diagrammatic representation of a sorting system designed to implement the method according to the invention, FIG. 2 shows a detailed view to explain the material type determination in the sorting system of FIG. 1, FIG. 3 shows a detailed view to explain a modified determination of material type, FIG. 4 shows a modified embodiment of the sorting system of FIG. 1 and FIG. 5 shows an extension of the sorting system of FIG. 1.

The sorting system 10 shown in FIG. 1 includes a conveyor belt 12, on which the items to be sorted 14 are placed, in such a way that there is no mutual contact. For the example it is assumed that the items 14 are hollow plastic bodies, such as bottles, cups or other containers, which are either in their original state or can be deformed by compressing. The conveyor belt 12 is driven at a uniform speed in the direction of the arrow and is so designed that the items 14 are conveyed without slipping. For this purpose the conveyor belt 14 may have suitable structures 16 which are only suggested schematically in the drawing.

The conveyor belt 12 passes through an imaging system 20, in which colour pictures of the items are taken and converted into video signals. The imaging system 20 includes a first colour video camera 22, to which are allocated lamps 24, which illuminate the items 14 with diffuse incident light, so that the colour video camera 22 takes pictures of the items 14 in incident light. The imaging system 20 also contains a second colour video camera 26, to which are allocated one or more lamps 28, which illuminate the items 14 from the opposite side of the conveyor belt 12, so that the colour video camera 26 takes pictures of the items 14 in transmitted light. To permit transmitted illumination, the conveyor belt 12 must be light-transmitting; for example, this can be an open-pored fabric belt or it may have a latticed structure.

The colour video cameras 22 and 26 can be normal matrix or line cameras; they may also be special cameras with a spectral sensitivity adapted to the items to be sorted. Each colour video camera emits electrical image signals at its outputs, which represent, for example, the colour separations in the primary colours red, green and blue.

The image signals delivered by the two colour video cameras 22 and 26 are delivered to an image computer 30, where features of colour and shape of the items photographed are obtained from the incident light image and the transmitted light image, using known methods of electronic image processing. A suitable image computer, for example, is described in detail in PCT publication WO 90/10273. This known image computer converts the analog colour video signals delivered by a colour video camera, image point by image point, into digital signals, the digitalized colour video signals are classified, image point by image point, according to specified colour classes and the digitalized and classified colour video signals are finally stored, image point by image point, in an image memory. The digitalized image stored in this way is finally analyzed by the image computer on the basis of the allocation of the image points to various colour classes in order to obtain features of colour and geometric shape. A particular advantage of this known image computer consists in the fact that it can be trained by showing image details to which is allocated a colour class in each case.

So that the features of colour and shape detected by the image computer 30 can be allocated in the correct position to the items 14 and their components, the image computer 30 receives data from a position transmitter 32 and a speed sensor 34. The position transmitter 32, for example, always delivers a position signal to the image computer 30 when an item 14 is located in a predetermined position and the speed sensor 34 delivers to the image computer 30 a signal which indicates the conveying speed of the conveyor belt 12. By virtue of these signals and the known distance between the position transmitter 32 and the colour video cameras 22 and 26, the image computer 30 can calculate the position of each item 14 in the field of view of either colour video camera 22 or 26 at the moment the picture is taken and can allocate a particular position on the item to any colour or shape feature determined.

If necessary the image computer 30 can also trigger the taking of a picture when an item occupies a particular position in the field of view of the colour video camera.

After passing through the imaging system 20 the items 14 are carried by the conveyor belt 12 through a material recognition system 40. The material recognition system 40 contains a contactless material sensor 42 of known type, for example a microwave sensor, an X-ray sensor or a spectroscopic sensor operating in the near infrared range ("NIR"), and a radiation source 44 which irradiates the items 14 with radiation to which the material sensor 42 used is sensitive. In the following description it is assumed that the material sensor 42 is an NIR spectroscopic sensor; accordingly the source of radiation 44 illuminates the items 14 with light, the wavelength of which extends into the near infrared range. A normal halogen lamp can be used for this.

FIG. 2 shows how the NIR spectroscopic sensor 42 scans an item 14 that is being carried by the conveyor belt 12 and illuminated by the radiation source 44, in order to determine the type of material of the item 14. By way of a lens system 46, the NIR spectroscopic sensor 42 picks up the light that is reflected by the surface of the item 14 in a relatively small measuring field 48. The measuring field 48, which is determined by the aperture of the lens system 46, typically has a diameter of approx. 2 cm. The light absorbed by the lens system 46 is dispersed into a spectrum by a grating, the wave length range being limited to between 1600 nm and 2000 nm. In the reflectance spectrum, the individual plastics reveal clear differences, so that by making comparison with a library of previously established spectra, it is possible to identify a specific plastic from them. The NIR spectroscopic sensor 42 emits a signal at the output which identifies the type of material detected or a signal which indicates that it was not possible to determine the material.

In the example in FIG. 2 it is assumed that the item 14 is a deformed plastic bottle with a bottle body 50, a sealing cap 52, a label 54 and an opaque base cup 56. A base cup is a plastic casing to reinforce the base of plastic bottles, said casing generally consisting of a plastic that differs from the plastic of the bottle body. Similarly, the sealing cap generally consists of a material that differs from the bottle body. Correct determination of the type of material of a specific component of the item 14, for example the bottle body 50, assumes that the measuring field 48 is located exclusively, at the moment of reading, on a surface region of this component which must moreover not be disturbed by labels, metal stamps or other stick-on labels or print, which will falsify the reflectance spectrum. Sharp edges located in the measuring field 48 can falsify the measurement result, too. If, for example, the measuring field 48 is located on the label 54, then the measuring result may be useless, if the label is made of paper and therefore does not supply any recognizable spectrum, or the measuring result may be wrong if the label 54 consists of a plastic that is different from the bottle body 50. If the measuring field at the moment of reading is partly located on the sealing cap 52 and partly on the bottle body 50, then it will not be possible to determine positively the material type of either of these two components. The same applies, if the measuring field 48 overlaps the bottle body 50 and the base cup 56. Even if the material sensor 42 has performed a perfect determination of the material type, it must be absolutely clear whether the material type detected should be allocated to the bottle body 50, the sealing cap 52, the label 54 or the base cup 56.

These problems are solved in the case of the sorting system illustrated in FIG. 1 with the help of electronic image processing carried out by the image computer 30. On the basis of the colour and shape features obtained, the image computer 30 can detect characteristic components of the items 14, such as the sealing cap, the bottle body, the label and the base cup of the plastic bottle in FIG. 2 and supply position data which indicate the positions of the detected components in the stored digitalized image. These position data are supplied to a material recognition computer 60 allocated to the material recognition system 40 and is either converted by the latter or even by the image computer 30 on the basis of the known conveying speed of the conveyor belt 12 and the known distance between the imaging system 20 and the material recognition system 40, to positions which these components occupy when passing through the material recognition system 40. The material recognition computer 60 can then control the function of the material sensor 42 in different ways, so that the material types of the items 14 or the material types of their individual components are correctly identified.

A first possibility consists in that the material sensor 42 continuously determines the material type whilst the items 14 are conveyed through the measurement window 18, but that the material recognition computer 60, only selects those measuring results which originate from positions on the items, from which it is certain, based on the shape and colour features obtained by the image computer 30, that they are appropriate for undisturbed determination of material type. Based on the position data supplied by the image computer 30, the material recognition computer 60 knows when the measuring field 48 of the material sensor 42 is located at such an appropriate position on an item. In this way, it is also possible to determine separately the material types of various components of an item 14. A rapid-measuring NIR spectroscopic sensor, which is currently available, can deliver between 10 and 1000 measurements per second. Based on the position data supplied by the image computer 30, the material recognition computer 60 in the example shown in FIG. 2, can specifically select from the large number of measurements those which originate only from the sealing cap 52, only from the bottle body 50, only from the label 54, or only from the base cup 56. This permits unmistakable allocation of the material types determined by the material sensor 42 to the various components of the item 14.

A modification of this first possibility consists in that the determination of the material type by the material recognition sensor 42 is not continuous, but is always triggered by the material recognition computer when the measuring field is located at the point required for determination of the material type.

A second possibility for undisturbed determination of the material types using the material recognition computer 60, consists in that the measuring field 48 of the material sensor 42 is directed towards a spot which permits undisturbed determination of the material type. This may be done, for example, with the modified embodiment of the material recognition system 40 shown in FIG. 3. With this embodiment the light beam reflected by the surface of the item 14 in the measuring field 48 is not received directly by the lens system 46 of the material sensor 42 but following deflection by the mirror 62 of a mirror galvanometer 64. The material recognition computer 60 controls the mirror galvanometer 64 in such a way that the measuring field 48 of the mirror 62 is directed towards a specific spot on the item 14, of which it is established, by virtue of the colour and shape features determined by the image computer 30, that it is appropriate for undisturbed determination of the material type, and the position of which is known by virtue of the position data supplied by the image computer 30. If required, the mirror galvanometer 64 of the material recognition computer 60 can also be controlled so that the measuring field 48 follows the chosen spot on the item 14 for a specific period, whilst the latter is in motion.

Instead of deflecting the measuring field 48 with the help of a mirror galvanometer 64, it would, of course, also be possible to swing the entire material sensor 42 under control of the material recognition computer 60 in such a way that the measuring field 48 is directed towards the desired spot. Deflection with the help of a mirror galvanometer, however, produces the advantage that it can be done very quickly and practically inertia-free with little power.

Higher spatial and temporal resolution material recognition can be achieved in that the normally circular aperture of the material sensor 42 is deformed in such a way by anamorphotic lenses or optical fibre systems, that it takes on a linear shape directed transversely of the direction of conveying. This means that, seen in the direction of conveying, narrow segments can be measured. By means of a temporal or spatial control of this aperture based on the signals supplied by the imaging system 20, determination of the type of material, which is better limited in terms of location, is achieved than when a circular aperture is used. Thus, for example, the type of material of sealing caps or other components of small dimensions can be specifically determined without overlapping the bottle body.

In particular when determining the types of material of items which consist of several different plastics, it may also be of advantage to divide the aperture of the material sensor in such a way, that several separate measuring fields are created which are then simultaneously taken in. Such a division is easy to perform with the help of an arrangement of optical fibres or by means of optical elements, such as lenses or masks. The division of the measuring field and the taking in of the desired spots by the part measuring fields obtained, can be controlled by the material recognition computer 60, on the basis of data supplied by the image computer 30. This means, for example, that in the case of a beverage bottle, the body of which is made of a plastic and which is partially hidden by a label made from a different plastic, the bottle body can be detected simultaneously by two separate measuring fields on the left and right of the label, without the label also being detected.

In stead of illuminating a large area of the items 14 with the radiation source 44, and determining the shape and extent of the measuring field 48 through the aperture of the material sensor 42, as was previously assumed, it is also possible to design the material sensor 42 with a large aperture and to determine the size, shape and position of the measuring field by illumination which is limited in terms of location and time, from the radiation source 44. Then, at the time of measurement, only those points are actively illuminated where material-type determination is to take place. This is achieved by illumination that is controlled by the material recognition computer 60, the light distribution of said illumination being determined on the basis of the position data supplied by the image computer 30. Suitable computer-controlled light valves can, for example, be made up using liquid crystal light valves, and these are known to the expert. Using this light-controlled development of the measuring fields, the additional measures described above, for altering the shape of or dividing the measuring field, can be carried out in a way that is particularly simple. For example, the division of the measuring field into several partial measuring fields can be obtained by providing that the illumination takes place in a corresponding local pattern.

In the sorting system of FIG. 1, both the colour, shape and position data supplied by the image computer 30 and the material type data supplied by the material recognition computer 60, are passed to a sorting computer 70, which sorts the items 14 on the basis of these data. A series of sorting points 72 is arranged along the conveyor belt 12, which, in the simplest case, could be made from pneumatic ejectors which blow the items 14 into separate containers down chutes 74. For the sake of simplification, only three such sorting points are shown in FIG. 1, but their number can, of course, be as large as required. Each sorting point 72 is used to separate out the items 14, which belong to a specific sorting category. The user can set the sorting criteria for each sorting category at the sorting computer 70 and can allocate each sorting category to a sorting point 72. On account of the known conveying speed and the known distances between the sorting points 72 and the position transmitter 32, the imaging system 20 and the material recognition system 40, the sorting computer 70 can determine exactly when a specific item 14 can be found at the site of a specific sorting point and it can then trigger that sorting point 72 which is allocated to the sorting category, to which this item belongs, according to the colour and/or shape features supplied by the image computer 30, and in accordance with the material type data supplied by the material recognition computer 60. Items which do not belong to any set sorting category, drop into a collecting bin at the end of the conveyor belt.

In this way, it is possible to achieve as fine a degree of sorting as is required in accordance with a large number of sorting criteria. Thus, not only can all items be sorted separately according to material types, but sorting can take place within each type of material or within specific material type groups according to transparent and non-transparent materials, coloured and uncoloured materials, and finally according to colours. Distinguishing between transparent and non-transparent substances is made possible in particular by the fact that pictures are taken of the items both in incident and in transmitted light.

FIG. 4 shows a modified embodiment of the sorting system of FIG. 1. It contains the same components as that of FIG. 1, which are also designated by the same reference symbols as in FIG. 1. The sorting system of FIG. 4 differs from that of FIG. 1 in that the material recognition system 40, in the direction of travel of the conveyor belt 12, is not arranged behind, but ahead of the imaging system 20. In this case, the material sensor 42 has to be operated in such a way that it continuously determines the types of material of all items which pass through the measuring field 48, and the material recognition computer 60 must have a memory in which all the measuring results supplied by the material sensor 42 are stored with allocation to the positions of the components measured. Such a memory can, for example, be executed by electronic time-delay elements. Subsequently, the image computer 30 again determines colour and shape features and determines the position of spots on the items, which are appropriate for undisturbed determination of the type of material. The position data supplied by the image computer 30 is again conveyed to the material recognition computer 60 and can be converted on the basis of the known conveying speed of the conveyor belt 12 and the known distance between the material recognition system 40 and the imaging system 20 to the positions which the spots concerned had occupied previously whilst the type of material was being determined in the material recognition system. Since the measuring results are stored in the memory of the material recognition computer 60, as allocated to these positions, this memory can be addressed by the converted position data in such a way that the measuring results are read out which originate from the spots which were found to be suitable by the image computer 30 and identified by the position data. These measuring results are supplied to the sorting computer 70 in the same way as for the sorting system of FIG. 1, and said sorting computer 70 controls the sorting points 42 according to the set sorting criteria, in the way described previously.

With the embodiment of FIG. 4, it is not possible to direct the measuring field 48 of the material sensor 42 by deflecting it to specific spots, on the basis of the position data supplied by the image computer 30, as shown in FIG. 3, because this measure assumes that the imaging system is arranged ahead of the material recognition system. Apart from this, the embodiment in FIG. 4 offers the same facilities for sorting the items as that of FIG. 1.

FIG. 5 depicts a further embodiment of the sorting system, which shows in particular, how the data obtained by processing the images in the image computer 30 can be beneficially used for further purposes. The embodiment of FIG. 5 represents an extension of the embodiment of FIG. 1; it contains all the components of the embodiment of FIG. 1, which are designated with the same reference symbols as in the latter. In addition, in the case of the embodiment of FIG. 5, two additional stations, 80 and 90, through which the items 14 are conveyed, are inserted between the material recognition system 40 and the sorting points 72 along the conveyor belt 12.

Station 80 is used to separate out items made from glass, i.e. in the case of the example chosen of sorting hollow bodies, in particular glass bottles and other glass containers. The weight of each hollow body 14 is determined by a rapid belt scale 82 and entered in a computer 84. From the weight alone, it is not possible to distinguish between glass and plastic containers, if the dimensions of the hollow body are not known. Therefore, data regarding features of shape are transmitted by the image computer 30 to the computer 84 and from these data, the computer 84 can estimate the size of the hollow body. By linking the weight and geometrical size, the computer 84 decides whether the item in question is a glass body or a plastic body. The computer 84 then controls a sorting point 86 in such a way, that the glass bodies are separated by an eject device 88. The sorting point 86, as shown in FIG. 5, may be located immediately next to station 80. However, it may also be added to the sorting points 72 at the end of the conveyor belt 12; in this case, the computer 84 delivers to the sorting computer 70 data, which identify the positions of recognized glass bodies, so that the sorting computer 70 can separate out the glass bodies by operating the appropriate sorting point. As a rule, it is advantageous to combine all the eject stations at the end of the conveyor belt and to set them up in close proximity to one another. Synchronization is easily achieved by the sorting computer 70, since from the position data supplied by the various stations, the known belt speed and the known distances between the stations and the sorting points, the moment when the sorting points are to be operated can be precisely determined.

The station 90 is a separating station, where the sealing caps 52 and the base cups 56 are separated from the bottle bodies 50 and ejected. A computer 92 receives position data from the image computer 30 regarding the positions of sealing caps 52 and base cups 56 on the hollow bodies 50, and from the material recognition computer 60 data about the types of material of these components. On the basis of these data, the computer 92 decides whether a sealing cap and/or a base cup is to be separated, and at the right moment when the hollow body 50 is passing, it triggers a separation device 94, which separates the part in question and ejects it via an eject station 96.

It can therefore be seen that in the additional stations 80 and 90, as in the material recognition system 40, the features of shape and colour and position data obtained by image processing in the image computer 20 are also used for concerted sorting.

Naturally, additional stations can be added to the sorting system of FIG. 5, if required. A particular advantage of the invention consists in the fact that the sequence of stations is arbitrary, since the functions of the stations are controlled on the basis of the position data which can be calculated for each station independently of the others.

Further modifications, with which the expert is familiar, can of course be made to the sorting systems described. For example, instead of a conveyor belt, any other known means of conveying may be used which is capable of conveying the items through the various stations without slipping, for example, a rotating table. Furthermore, the functions of various computers which are shown separately in the drawings for the sake of clarity, may be carried out by one common computer.

I claim:

1. A method for sorting materials, in particular plastic parts, comprising:

conveying items at known conveying speed past a material recognition system which uses non-contact scanning of each item to determine its material type in a measuring field and delivers a signal that identifies the material type and is used in sorting the items according to material type;

conveying the items past an imaging system which takes pictures of the items;

detecting features of colour and/or shape of the items from the pictures using electronic image processing techniques;

deriving position data from the features of colour and/or shape regarding spots on the item at which an undisturbed determination of the material type is possible without disturbance by other material types; and determining the material type using the material recognition system, wherein determination of the material type is confined to such undisturbed spots as identified by the position data.

2. The method according to claim 1, wherein the imaging system in the direction of conveyance of the items is located ahead of the material recognition system.

3. The method according to claim 2, wherein determination of the material type is triggered by the material recognition system when an undisturbed spot of an item, identified by the position data, is located in the measuring field of the material recognition system.

4. The method according to claim 2, wherein the position data are used for controlling a deflection system, so that the measuring field of the material recognition system is directed towards an undisturbed spot on the item.

5. The method according to claim 2, wherein the illumination of the items by radiation necessary to determine the material type, is limited to the undisturbed spots identified by the position data while the measuring field of the material recognition system covers a larger area of the items.

6. The method according to claim 2, wherein of all the signals supplied by the material recognition system, only those are utilized as being valid which originate from undisturbed spots identified by the position data.

7. The method according to claim 1, wherein the material recognition system, in the direction of conveyance of the items, is located ahead of the imaging system, the signals supplied by the material recognition system are stored and of the stored signals only those are utilized as being valid, which are allocated to the undisturbed spots as identified by the position data.

8. The method according to claim 1, wherein the measuring field of the material recognition system is deformed by optical systems in such a way that, in the direction of conveyance, it has a high local resolution compared with the transverse direction.

9. The method according to claim 1, wherein the measuring field of the material recognition system is divided by optical elements and/or fibre optics in such a way that it covers the items at various spots according to a spatial pattern.

10. The method according to claim 9, wherein the spatial pattern is determined by the distribution of the illumination of the items using radiation necessary to determine the material type within the measuring field.

11. The method according to claim 9, wherein the spatial pattern is selected in such manner that it simultaneously detects several spots on the items which are significant for determining the material type.

12. A device for sorting materials, in particular plastic parts, comprising a conveying device for the slip-free conveyance of the items at a known speed, an imaging system past which the items are conveyed and which takes pictures of the items and converts these into electrical image signals, an image computer which determines features of colour and/or shape of the items from the electrical image signals, a material recognition system past which the items are conveyed and which contains a material sensor for non-contact scanning of each item in a measuring field and a material recognition computer which by processing the output signals of the material sensor determines the material type in the measuring field and delivers a signal that identifies the material type, and a sorting device which sorts the items on the basis of the signals supplied by the imaging system and by the material recognition system according to fixed sorting categories, wherein the image computer derives, from the features of colour and/or shape obtained, position data about spots on the items at which an unequivocal determination of material type is possible without disturbance by other material types, and wherein the material recognition computer receives the position data from the image computer and, based on the position data received, confines the determination of the material type to the undisturbed spots identified by the position data.

13. The device according to claim 12, wherein the imaging system contains a colour video camera which takes pictures of the items in incident light.

14. The device according to claim 12, wherein the imaging system contains a colour video camera which takes pictures of the items in transmitted light.

15. The device according to claim 14, wherein each colour video camera is a line or matrix camera.

16. The device according to claim 12, wherein the material sensor is an NIR spectroscopic sensor.

17. The device according to claim 12, wherein the imaging system, in the direction of conveyance of the items, is located ahead of the material recognition system.

18. The device according to claim 17, wherein an optical deflection device is located in the path of the light beam that determines the measuring field, said deflection device being controlled by the material recognition computer on the basis of the position data supplied by the imaging system in such a way that the measuring field is directed to an undisturbed spot on the item, as identified by the position data.

19. The device according to claim 18, wherein the optical deflection device is a mirror galvanometer.

20. The device according to claim 12, wherein the imaging system, in the direction of conveyance of the items, is located behind the material recognition system and the material recognition computer contains a memory in which all the signals supplied by the material sensor are stored and which is read out by addressing it by the position data supplied by the image computer.

21. The device according to claim 12, wherein a sorting computer is assigned to the sorting device and this computer receives data from the image computer and from the material recognition computer and controls the sorting of the items, on the basis of these data, according to sorting categories determined by set sorting criteria.

22. The device according to claim 12, comprising a station located on the conveying device for separating out glass bodies using a belt scale measuring the weight of the items, and an associated computer which receives data from the image computer about shape features, which enable the size of the items to be determined, and which detects present glass bodies on the basis of the size and weight measured.

23. The device according to claim 12, comprising a station located along the conveying device for separating components of the items using a separating device, and a computer controlling the separating device, which receives position data from the image computer about the components to be separated.

* * * * *